United States Patent [19]

Hagen et al.

[11] Patent Number: 5,403,489
[45] Date of Patent: Apr. 4, 1995

[54] SOLID PHASE EXTRACTION METHOD AND APPARATUS

[75] Inventors: Donald F. Hagen, Woodbury; Craig G. Markell, White Bear Township, Ramsey County, both of Minn.

[73] Assignee: Minnesota Mining and Manufacturing Company, St. Paul, Minn.

[21] Appl. No.: 81,647

[22] Filed: Jun. 24, 1993

[51] Int. Cl.⁶ ............................................. B01D 15/04
[52] U.S. Cl. ................................. 210/638; 210/636; 210/660; 210/321.75; 210/321.84; 210/500.42; 210/502.1; 210/505; 210/87; 210/138; 210/142; 210/145; 210/909
[58] Field of Search ............. 210/634, 321.75, 321/84, 210/500.25, 87, 500.42, 500.27, 502.1, 503, 505, 636, 365, 198.3, 692, 908, 909, 670, 195.2, 333.1, 778, 644, 635, 656, 638, 142, 145, 138, 660; 436/43

[56] References Cited

U.S. PATENT DOCUMENTS

| 3,085,687 | 4/1963 | Erbach | 210/321.75 |
|---|---|---|---|
| 3,992,301 | 11/1976 | Shippey et al. | |
| 4,213,859 | 7/1980 | Smakman et al. | 210/321.75 |
| 4,842,745 | 6/1989 | Weiler et al. | 210/909 |
| 4,921,610 | 5/1990 | Ford et al. | 210/636 |
| 4,943,379 | 7/1990 | Boze et al. | 210/778 |
| 4,963,253 | 10/1990 | Yen | 210/195.2 |
| 4,973,406 | 11/1990 | Poazielli | 210/333.1 |
| 4,986,918 | 1/1991 | Breelan et al. | 210/652 |
| 5,013,341 | 5/1991 | Isaksson et al. | |
| 5,032,265 | 7/1991 | Jha et al. | 210/195.2 |
| 5,071,565 | 12/1991 | Fritz et al. | 210/692 |
| 5,071,610 | 12/1991 | Hagen et al. | 210/502.1 |
| 5,110,733 | 5/1992 | Kim et al. | 210/634 |
| 5,132,015 | 7/1992 | Down | 210/637 |
| 5,147,539 | 9/1992 | Hagen et al. | 210/198.3 |
| 5,207,915 | 5/1993 | Hagen et al. | 210/635 |
| 5,242,598 | 9/1993 | Shannon et al. | 210/909 |
| 5,248,428 | 9/1993 | Hagen et al. | 210/656 |
| 5,279,742 | 1/1994 | Markel et al. | 210/638 |

FOREIGN PATENT DOCUMENTS

| 0498557A1 | 8/1992 | European Pat. Off. |
|---|---|---|
| 2583036 | 12/1986 | France |
| WO87/03217 | 6/1987 | WIPO |
| WO93/00163 | 1/1993 | WIPO |

OTHER PUBLICATIONS

Horack et al., *Perspectives from the Leading Edge in Solid Phase Extraction,* LC.GC 11, No. 2, pp. 74–90 (Feb. 1993).

Markell, C., Hagen, D. F., and Bunnelle, V. A., *New Technologies in Solid-Phase Extraction, LCGC The Magazine of Separation Science,* vol. 9, No. 5 (1991).

Hagen, D. F., Markell, C. G., Schmitt, G. A., and Blevins, D. D., *Membrane Approach To Solid-Phase Extractions,* Analytica Chimica Acta, 236 157–164 (1990).

O'Donnell et al., Proceedings from Seventh Annual Waste Testing and Quality Assurance Symposium, 2, 182–194, Washington, DC (Jul. 8–12, 1991).

Hogan, *Particulates Captured/Carried By Fibrillated PTFE,* Design News (Feb. 9, 1987).

Primary Examiner—Robert A. Dawson
Assistant Examiner—Ana M. Fortuna
Attorney, Agent, or Firm—Gary L. Griswold; Walter N. Kirn; Karl G. Hanson

[57] ABSTRACT

A method and apparatus for performing solid phase extraction (SPE) on a fluid that contains solubles and suspended solids. The method includes: (a) providing a volume of fluid that contains solubles and suspended solids, (b) processing the volume of fluid to extract solubles therefrom by the steps comprising: (i) passing a first portion of the volume of fluid through a SPE medium that has first and second sides, the first portion of the volume of fluid passing through the SPE medium from the first side to the second side; and then (ii) passing a second portion of the volume of fluid through the SPE medium from the second side to the first side; and (c) repeating step (b) a plurality of times such that no substantial amount of the suspended solids is removed from the processed volume of fluid and solubles are retained on the SPE medium. The apparatus includes a conduit, a SPE medium located in the conduit, and a fluid flow direction altering mechanism or a SPE rotating mechanism.

32 Claims, 2 Drawing Sheets

SOLID PHASE EXTRACTION METHOD AND APPARATUS

TECHNICAL FIELD

This invention pertains to a process and apparatus for performing a solid phase extraction on a fluid that contains solubles and suspended solids.

BACKGROUND OF THE INVENTION

Solid phase extraction (SPE) is a popular and growing technique for preparing samples for analysis. See Horack et al., *Perspectives from the Leading Edge in Solid Phase Extraction*, LC.GC 11, No. 2, p. 7490 (February 1993). Sometimes referred to as liquid solid extraction, SPE typically involves use of a membrane or other medium that has sorptive properties. A fluid is passed through the SPE medium, and various substances in the fluid are extracted onto the SPE medium by being sorbed thereon. The extracted substances are subsequently removed from the SPE medium in a concentrated form by, for example, desorption with an elution solvent. The extracted substances can then be analyzed to determine composition, concentration, et cetera. SPE is rapid, less labor intensive than conventional liquid/liquid extractions, and it eliminates, or at least minimizes, the need for large volumes of costly solvents which must be disposed of in an environmentally sound manner. Some of the many examples in which SPE is used include: determining trace amounts of pesticides in river water; analyzing pollutants in waste water; isolating organic compounds from groundwater; and testing urine samples.

Although SPE has been met with increased popularity in the analytical art, the method has a significant drawback: it is difficult to carry out SPE on a fluid that contains suspended solids. In attempting to perform SPE on such a fluid, the SPE medium's pores become plugged with the solid particles as the fluid is passed through the SPE medium. Pore plugging slows passage of fluid through the SPE medium and can render the SPE process extremely time consuming; see Markell et al., *New Technologies in Solid Phase Extraction*, LC.GC, 9 No. 5 (1991); and O'Donnell et al., Proceedings from Seventh Annual Waste Testing and Quality Assurance Symposium, 2, 182–194, Washington, DC (Jul. 8–12, 1991). The pore-plugging problem is particularly problematic for fluids that contain large quantities of suspended solids, for example, river water.

Several approaches have been suggested in the SPE art to overcome the slow flow rates caused by suspended solids in a fluid. Markell et al. (supra) have suggested using a smaller sample and detecting the analyte in the extract by more sensitive analytical methods, and if a larger sample needs to be processed, Markell et al. have suggested using a pre-filter to remove the suspended solids; see also supra O'Donnell et al. Another approach taught by Markell et al. involves allowing the sample to settle, and then performing SPE on the clear layer of the sample. It also has been suggested to pretreat the fluid with an acid to dissolve certain solids such as insoluble salts. See Hagen et al., *Membrane Approach to Solid Phase Extractions*, Analytica Chimica Acta, 236 157–164 (1990).

SUMMARY OF THE INVENTION

The present invention provides a new method and apparatus for overcoming the aforementioned pore-plugging problem which has been encountered when SPE is carried out on a fluid that contains suspended solids.

The method of the invention comprises:

(a) providing a volume of fluid that contains solubles and suspended solids;

(b) processing the volume of fluid to extract solubles therefrom by the steps comprising:

(i) passing a first portion of the volume of fluid through a solid phase extraction medium that has first and second sides, the first portion of the volume of fluid passing through the solid phase extraction medium from the first side to the second side; and then (ii) passing a second portion of the volume of fluid through the solid phase extraction medium from the second side to the first side; and (c) repeating step (b) a plurality of times such that no substantial amount of the suspended solids is removed from the processed volume of fluid and solubles are retained on the solid phase extraction medium.

The apparatus of the invention comprises: (a) a conduit having an inlet and an outlet; (b) a solid phase extraction medium located in the conduit downstream to the inlet and upstream to the outlet the solid phase extraction medium having first and second sides; and (c) a means for passing the fluid through the solid phase extraction medium from the first side to the second side and from the second side to the first side.

The method and apparatus of this invention allow SPE to be performed on a suspended solid containing fluid in a relatively short time span. By passing the fluid through the SPE medium in opposite directions a plurality of times, the pore clogging problem is minimized or alleviated, and a higher flow rate through the SPE medium is achieved. Solids that have entered the SPE medium's pores become dislodged when fluid flow is reversed through the SPE medium. The dislodged solids enter the effluent stream and are discharged from the SPE process and apparatus. Some solids may not become dislodged from the SPE medium; however, this amount is relatively small when compared to the amount of solids that accumulated on the SPE medium in prior art methods. In this invention, no substantial amount of solids is removed from the volume of fluid. The term "no substantial amount" means that no more than twenty weight percent of the suspended solids are removed from the volume of fluid by the SPE medium. Preferably, less than fifteen weight percent, and more preferably less than ten weight percent of the suspended solids are removed by the SPE medium when performing SPE in accordance with the present invention.

Thus, using the method and apparatus of this invention, very little filtration occurs and a relatively high extraction of solubles can be achieved in a relatively short time frame. In prior art SPE techniques, the discharged effluent contained hardly any suspended solids. This was because the SPE medium was performing an extraction in conjunction with a filtration. This invention permits SPE to be performed without substantial filtration, thereby overcoming the problems that were previously encountered when SPE was performed on a fluid that contained suspended solids. The high extraction rates make this invention particularly suitable for rapidly processing environmental or biological samples which contain large quantities of suspended solids.

DETAILED DESCRIPTION OF THE PREFERRED EMBODIMENTS

Figure 1A:
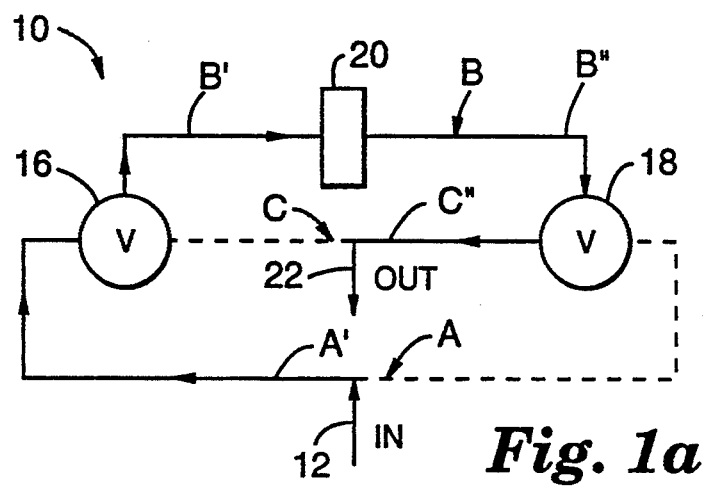
FIGS. 1a and 1b are plan views of a SPE apparatus 10 in accordance with the present invention.

In describing the preferred embodiments of the invention, specific terminology will be used for the sake of clarity. The invention, however, is not intended to be limited to the specific terms so selected, and it is to be understood that each term so selected includes all the technical equivalents that operate similarly.

The term "solid phase extraction medium" or "SPE medium" means a fluid permeable mass that allows solubles to be extracted from a fluid. The solubles typically are extracted from the fluid by being sorbed onto or into the SPE medium, see e.g. U.S. Pat. No. 5,071,610. The solubles also may be extracted from the fluid by reacting with substances in the SPE medium, see e.g. U.S. patent application Ser. No. 08/002,198, filed Jan. 8, 1993 (disclosure incorporated here by reference). The term "solubles" means a substance or substances that are in solution in ionic form, molecular form, or molecular aggregates dispersed in such finely divided form that they are not capable of being removed by particulate filters that lack sorptive and/or reactive properties. Many hydrophobic environmental pollutants, while generally considered to be insoluble, can be present in water or other fluids at very low levels, such as at parts per billion, and in some cases, at parts per trillion levels, and therefore are not removable from the fluid by a particulate filter. The present invention is especially suitable for recovering these solubles as analytes. Illustrative examples of solubles that can be recovered using the method and apparatus of this invention include pesticides, dioxins, polynuclear aromatics, polychlorinated biphenyls, plasticizers, surfactants, drug residues, and combinations thereof.

In the practice of this invention, SPE can be performed on suspended solid containing fluids in a relatively short time frame. Rather than passing a fluid through a SPE medium in a single direction only, as was done in prior art methods, the fluid is passed through a SPE medium in first and second opposite directions. When a fluid containing suspended solids is passed through a SPE medium, the solids accumulate primarily on and in the upstream side of the SPE medium. By passing the fluid through the SPE medium in two opposite directions, the accumulated solids are flushed out of the SPE medium to enter the fluid exit stream.

Alternating the direction of fluid flow through the SPE medium can be accomplished by reversing the flow of the fluid through the SPE medium or by keeping the direction of fluid flow constant and rotating the SPE medium with respect to the direction of fluid flow. Reversal of fluid flow and rotation of the SPE medium can be accomplished using the apparatus described below.

The rate of fluid flow reversal or rotation of the SPE medium may vary depending on such factors as the concentration and size of suspended solids in the fluid, the kind and size of the SPE medium and its pore number and pore size, and the rate of processing a volume of fluid. However, for a fluid containing approximately 0.1 milligram to 20 grams of suspended solids per liter, the rate of reversal of fluid flow or rotation of the SPE medium generally takes place at about 0.2 to 12 times per minute. The higher the rate of fluid flow reversal or rotation of SPE medium, the less opportunity there is for solids to plug the SPE medium, or to build up a flow restricting layer preceding the SPE medium. Thus, for fluids that contain high concentrations of suspended solids, for example, 10 to 20 grams of suspended solids per liter, fluid flow is reversed or the SPE medium is rotated about at least 4 times per minute. For fluids that contain lower concentrations of suspended solids, for example, 0.1 to 10 milligrams of suspended solids per liter, fluid flow is reversed or the SPE medium is rotated typically not more than about 0.3 times per minute.

Figure 1B:
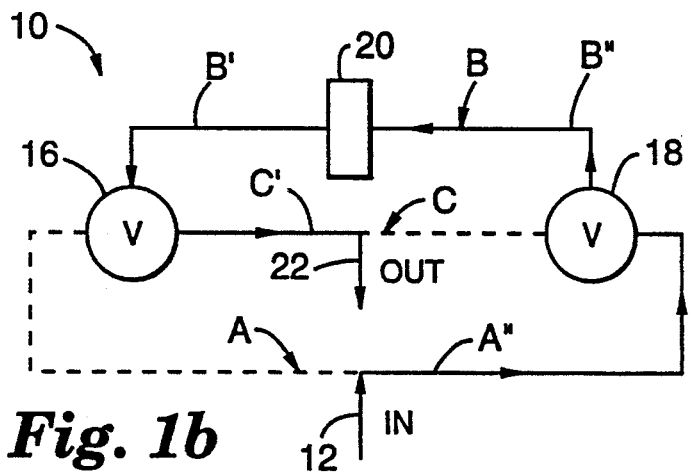

FIGS. 1a and 1b illustrate a plan view of an example of a SPE apparatus 10 useful for carrying out the method of this invention. SPE apparatus 10 has an inlet 12 through which a fluid enters the apparatus. Upon entering SPE apparatus 10 at inlet 12, the fluid enters a conduit system that includes portions A, B, and C. Portion A includes portions A' and A" which can communicate with inlet 12 and are located upstream to first and second valves 16 and 18, respectively. Portion B has a SPE medium 20 located therein, and includes portion B' and B" located on opposing sides of SPE medium 20. Portion C includes portions C' and C" which can communicate with the outlet 22 and are located downstream to the first and second valves 16 and 18, respectively.

When a fluid enters apparatus 10 at inlet 12, the fluid travels sequentially through either portions A', B', B", and C" or A", B", B', and C'. The first and second valves 16 and 18 are positioned in conduit system at the intersections of conduit portions A', B', C', and A", B", C", respectively. First and second valves 16 and 18 preferably operate simultaneously. When valve 16 is positioned such that conduit portion A' is in direct communication with conduit portion B', valve 18 is positioned such that conduit portion B" is in direct communication with conduit portion C". Positioned in this fashion shown in FIG. 1a, the fluid will flow from inlet 12 to the outlet 22 sequentially through conduit portions A', B', B", and C", as indicated by the arrow. To reverse the flow of fluid through the SPE medium 20, valve 16 and valve 18 are both switched as shown in FIG. 1b so that fluid travels from inlet 12 to outlet 22 sequentially through conduit portion A", B", B', and C' in the direction indicated by the arrow. This reversal of fluid flow by the switching of valves 16 and 18 causes solids accumulated on the upstream side of the SPE medium 20 to become dislodged therefrom and enter the fluid exit stream in conduit portion C. Reversal of fluid flow can be repeated as necessary to prevent substantial accumulation of solids on SPE medium 20.

Switching of valves 16 and 18 can be controlled by using a number of mechanisms. For example, a variable frequency multi-vibrator circuit can be used. Such a circuit comprises a regulated power supply, an adjustable synchronous multivibrator, a frequency counter, and a transistor amplifier to provide the necessary timing and power requirements for energizing the solenoids of the switching valves. This circuit can produce equally timed switching of the valves, see, FIG. 3a where equal times X and Y are provided for flow in opposite directions.

Figure 3A:
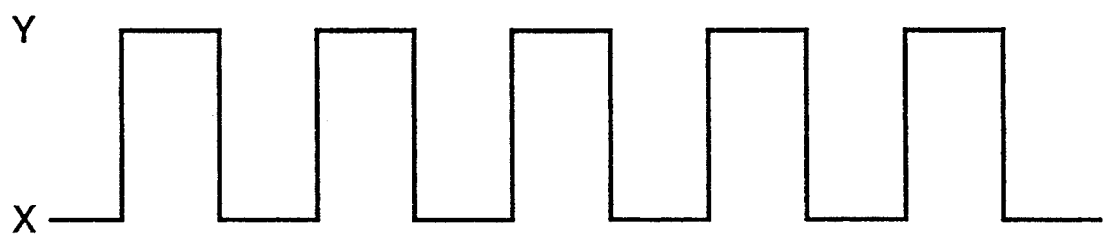
FIGS. 3a–3c illustrate timing sequences for passing a fluid through an SPE medium in accordance with the present invention. Position X represents the time a fluid is passing through the SPE medium in a first direction, and position Y represents the time a fluid is passing through an SPE medium in a second or opposite direction.
Figure 3B:
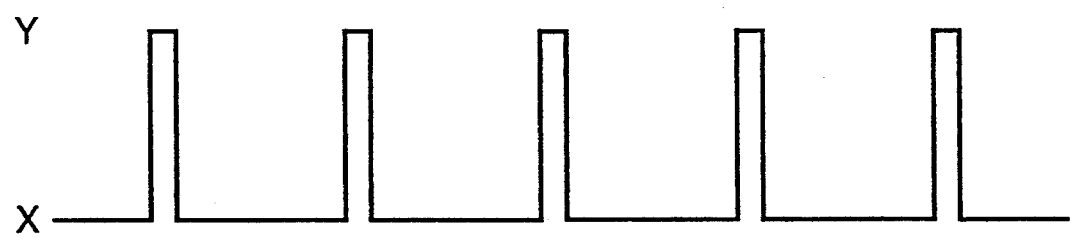

In a second embodiment, an adjustable one-shot multivibrator may be used in the circuit as a timing mechanism, whereby the time of reverse flow Y is minimized, see FIG. 3b. With this circuit, the on-off pulse widths control the valves such that the time interval X for fluid flow in a first direction is much greater than the time interval Y for fluid flow a second opposite direction. Thus, the bulk of the fluid flow passes through the SPE medium in a first direction, and a smaller volume of fluid passes through the SPE medium in the opposite direction.

Figure 3C:
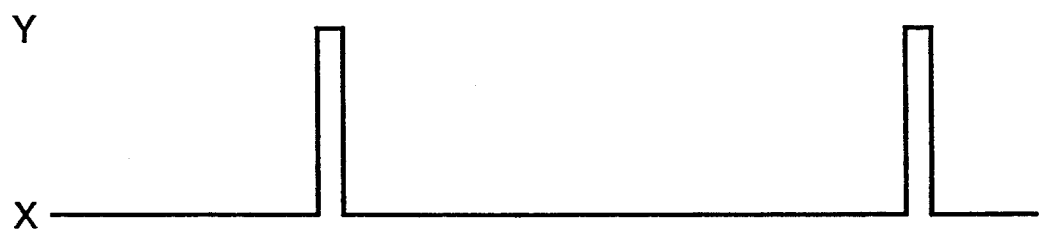

In a third embodiment, flow and or pressure sensors with appropriate electronic circuits can be used to sense an incremental decrease in flow, caused by plugging of the media pores, to automatically reverse fluid flow through the SPE medium, see FIG. 3c.

Other timed switching mechanisms that may be suitable for use in this invention include rotating cams driven by fixed or variable speed motors, and activating on/off switches supplying power to energize the solenoid valves which reverse fluid flow.

Although apparatus 10 is shown to have a single inlet and a single outlet, it may be desirable to provide the apparatus with more than one inlet and more than one outlet. For example, in the second and third timing embodiments described above, conduits C and C' of FIGS. 1a and 1b may be provided with separate outlets so that fluid effluent from a first direction flows into one collection vessel and the solids containing effluent from a second or opposite flow direction flows into a second collection vessel. The use of separate outlets can be helpful when a concentrated solids containing fraction is desired for further manipulation or analysis. The use of separate inlets may be desirable when a particular fluid (for example, distilled water) is desired to be used as a back flush.

Figure 2:
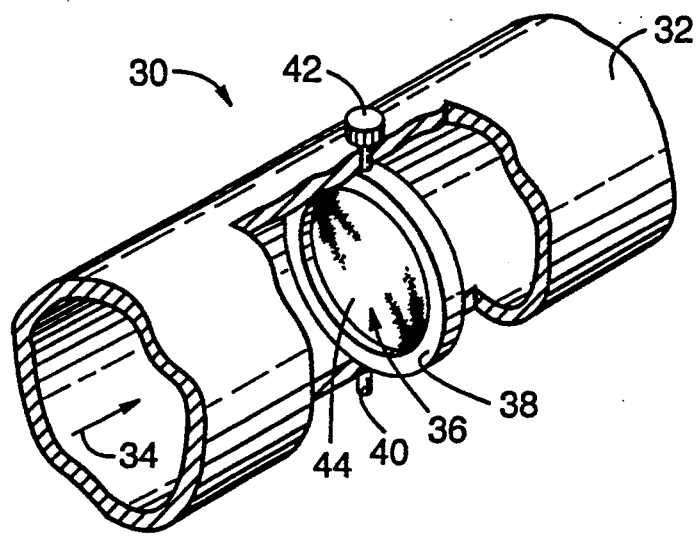
FIG. 2 is a perspective view of an alternative embodiment of a SPE apparatus 30 in accordance with the present invention.

FIG. 2 illustrates an alternative apparatus 30 for performing SPE. Apparatus 30 comprises a conduit 32 through which a suspended solid containing fluid may pass as shown by arrow 34. Located in conduit 32 is a SPE medium 36. SPE medium 36 is positioned in conduit 32 such that a fluid passing through the conduit will pass through the SPE medium. SPE medium 36 is held in the conduit by a supporting member such as a rotating frame 38 that is capable of changing the position of the SPE medium with respect to fluid flow. Rotating frame 38 may be rotated about an axis 40 by, for example, turning knob 42. Rotating frame 38 preferably is sized to correspond to the interior of conduit 32 to form a fluid tight fit therewith.

A suspended solid containing fluid passing through conduit 32 in the direction of arrow 34 causes solids to accumulate on the first or upstream side 44 of SPE medium 36. By turning knob 42, the SPE medium 36 can be rotated so that the fluid passes through the SPE medium 36 in an opposite direction. When the SPE medium 36 is rotated approximately 180 degrees, the upstream side 44 becomes the downstream side (not numbered), and the solids that were accumulated on what was the upstream side become dislodged by the fluid passing through the SPE medium 36. The dislodged solids then enter the fluid exit stream. By rotating the SPE medium 36 a number of times, there is no substantial accumulation of solids on the SPE medium, and the exit volume of fluid contains substantially the same total concentration of solids as the inlet volume of fluid. The only solids not be present in the outlet volume but present in the inlet volume are those solids not dislodged from the SPE medium after it has been rotated. Although knob 42 is shown as the means for rotating SPE medium 36, other mechanisms may be employed for rotating the SPE medium which do not require manual rotation. For instance, flow or pressure sensors may be employed in conjunction with appropriate electronic circuits and mechanical apparatus to automatically rotate the SPE medium in response to a decrease in flow or increase in back pressure.

In the above described apparatus 10 and 30, the fluid may be passed through the SPE medium by use of a pump or vacuum. The conduits and the members that hold the SPE media in the conduit are preferably made from inert materials that would not contaminate the processed fluid or the SPE medium. See, for example, Canadian Patent Application 2,034,946.

Any presently known or later developed SPE medium can be used in the method and apparatus of this invention. The SPE medium may take the shape of a disk or may take on other shapes, for example, sorptive particle packed articles such as beds, tubes, cartridges, and the like. Known SPE media include: porous media or membranes that contain sorptive particles, for example nonwoven polytetrafluoroethylene (PTFE) fibril matrices having sorptive particles enmeshed therein, see, for example, U.S. Pat. Nos. 5,147,539, 5,071,610, 4,971,736, 4,906,378, and 4,810,381, EP-A 0,498,557 A1, and WO 93/00163, the disclosures of which are incorporated here by reference; microporous polyvinyl chloride (PVC) sheets containing sorptive particles such as silica, alumina, titania, zirconia, and other inorganic oxides or ceramics; porous organic polymeric resins such as polyvinylpyrolidone, polystyrene(co-divinylbenzene), and derivatives thereof; glass fiber membranes containing sorptive materials such as silica; and porous functionalized polymeric membranes such as sulfonated polystyrene. Combinations of such SPE media may also be employed.

Particle loaded nonwoven PTFE fibril matrices are available from 3M Company, St. Paul, Minn. under the trademark EMPORE. Microporous PVC sheets containing activated silica which are available from FMC Corp., Pinebrook, N.J. Functionalized membranes are available from Millipore Corp., Bedford, Mass., under the trademark Milliseps and from CURO, Meridan, Conn. under the trademark Zetachrom. Glass fiber disks containing silica are available from Toxi-Lab, Irvine, Calif. SPE tubes that may be used in this invention are available from J. T. Baker, Phillipsburg, N.J.

Features and advantages of this invention are further illustrated in the following examples. It is to be expressly understood, however, that while the examples serve this purpose, the particular ingredients and amounts used as well as other conditions and details are not to be construed in a manner that would unduly limit the scope of this invention.

EXAMPLES

Example 1

This Example illustrates the sorption, onto both sides of a SPE membrane, of a slightly water soluble red dye (which mimics the behavior of certain pollutants such as pesticides). The red dye was added to an aqueous sample that contained suspended solids and Minnesota River water. The concentration of suspended solids was approximately 200 milligrams per liter. The sample was processed using the bidirectional flow method of the invention.

An Empore ™ 47 millimeter diameter, 0.5 millimeter thick, $C_{18}$ SPE disk containing 10 weight percent polytetrafluoroethylene and 90 weight percent octadecyl bonded silica (Varian Sample Preparation Products, Harbor City, Calif.) was placed in a Swinnex-47 filter disk holder (Millipore Corp., Bedford, Mass.). Porous polypropylene disks were placed on both sides of the SPE disk to provide physical support and optimum dispersion of the water sample to be extracted. The SPE disk was installed in series between conduit portions B' and B'' of a device having a conduit arrangement shown in FIGS. 1a and 1b. The conduits in the device were made of teflon tubing, joined by Swagelok ™ tees (Crawford Fitting Co., Solon, Ohio). Three-way solenoid valves (Catalog Number L-01367-72, Cole-Parmer, Chicago, Ill.) were used to alter fluid flow. The valves were controlled by a variable frequency multi-vibrator circuit.

Five milliliters of methanol were drawn through the disk to condition the disk as described by Hagen et al. in Analytica Chimica Acta, 236 157–164, 159 (1990)). A one liter solution of water containing 100 parts per billion (weight to volume) of Disperse Red I dye (Aldrich Chemical Co., Milwaukee, Wis.) and 0.5 volume percent methanol was then drawn through the disk at a flow rate of 33 milliliters per minute using a water aspirator vacuum source. The multi-vibrator switching circuit provided a flow reversal of 4 times per minute. Flow times in both the forward and reverse directions were equal as shown in FIG. 3a. The disk was then removed from the holder and cut with a razor blade to expose the 0.5 millimeter cross-section. A photomicrograph of the cross-section showed that the red dye was uniformly sorbed on both sides of the disk with a dye penetration into the disk of 0.07 millimeter.

Example 2

This Example shows the short time frame under which of various samples of water containing suspended solids can be processed using the method and apparatus of the invention.

This Example was performed as described in Example 1, except various one liter samples of river, creek, pond, and lake waters were processed to extract the Disperse Red I dye. Samples were processed in the bidirectional extraction mode of this invention and in the comparative unidirectional mode using the same apparatus and conditions, except the switching device was turned off, to allow the suspended solids to build up on the upstream side of the extraction disk. The time to process the samples is shown below in Table 1.

TABLE 1

| Water Source | Unidirectional Mode | Bidirectional Mode |
|---|---|---|
| Minnesota River[a] | >15 hours/liter* | 16.8 minutes/liter |
| Mill Pond[a] | 3 hours/250 milliliters* | 16.1 minutes/liter |
| Battle Creek[b] | 2 hours/350 milliliters* | 16.9 minutes/liter |
| Tanners Lake[c] | 2 hours/580 milliliters* | 18.3 minutes/liter |

*Suspended solids plugging the extraction disk reduced the flow to virtually zero at this point.
[a]Burnsville, MN; [b]Woodbury, MN; [c]Maplewood, MN Data in Table 1 demonstrate that the SPE method and apparatus of this invention allow SPE to be performed in a time period substantially less than the time period using state-of-the-art unidirectional flow method.

Example 3

This Example demonstrates that (i) no substantial amount of suspended solids is removed and (ii) faster processing times are obtained when SPE is performed according to the present invention, as opposed to a conventional unidirection SPE method.

One liter of Minnesota River water, Sample 1a, was processed in the bidirectional mode using the apparatus described in Example 1. A 47 millimeter Empore ™ SPE disk was dried and weighed before and after processing of the sample to establish the amount of suspended solids retained by the disk. The time needed to process a one liter of sample was measured. The discharge, Sample 1b, containing the bulk of the suspended solids not retained by the disk used in processing Sample 1a was then filtered in the unidirectional mode through a pre-dried and weighed 47 millimeter GMF-150 glass filtration disk (Whatman, Inc., Clifton, N.J.). Processing time was monitored, and the GMF-150 disk was then re-dried and weighed to obtain the weight of the suspended solids trapped by the disk in the unidirectional filtration mode of the prior art. A second one liter portion of the river water, Sample 2, was passed through a 47 mm Empore ™ SPE disk in the unidirectional mode. The flow time was monitored, and the Empore ™ disk was dried and weighed before and after processing to give the weight of the collected solids. A third one liter portion of the river water, Sample 3, was then filtered through a GMF-150 filtration disk in the unidirectional mode. SPE interactions do not occur with the GMF-150 disk because it does not contain sorptive particles but only serves to prevent passage of suspended solids through the porous media. Processing time was monitored, and the GMF-150 disk was dried and weighed before and after processing. Data for processing time and weight of suspended solids for Samples 1a, 1b, 2, and 3 are shown in Table 2.

TABLE 2

| Sample No. | Weight Solids Collected (mg) | Processing Time (minutes/liter) |
|---|---|---|
| 1a | 27 | 15 |
| 1b* | 122 | 420 |
| 2* | 202 | 900 |
| 3* | 195 | 420 |

*Comparative Samples

Data in Table 2 demonstrate that the amount of time required to process a 1 liter sample laden with suspended solids is substantially less than when done according to the present invention. The data also demonstrates that substantially less solids are removed when performing a SPE according to this invention.

Example 4

This Example describes the effect of flow reversal rates on processing time for a suspended-solid, laden river water sample.

In this Example, the Minnesota River water sample of Example 2 was extracted according to this invention as described in Example 1 but flow reversal rates of 0.5, 1, and 4 times per minute were used for Samples 4, 5, and 6, respectively. The samples had a solids content of approximately 200 milligrams per liter. Table 3 shows the data obtained at the various flow reversal rates listed.

TABLE 3

| Extraction Volume (milliliters) | Sample Number | | |
|---|---|---|---|
| | 4[a] Time to Process (min.) | 5[b] Time to Process (min.) | 6[c] Time to Process (min.) |
| 50 | 0.48 | 0.45 | 0.50 |
| 100 | 1.03 | 1.07 | 1.22 |
| 150 | 1.63 | 1.78 | 2.17 |
| 200 | 2.27 | 2.58 | 2.98 |
| 250 | 2.97 | 3.53 | 4.08 |
| 300 | 3.70 | 4.57 | 5.58 |
| 350 | 4.45 | 5.73 | 6.98 |
| 400 | 5.28 | 7.07 | 8.70 |
| 450 | 6.12 | 8.57 | 10.70 |
| 500 | 7.05 | 10.07 | 12.80 |
| 550 | 8.05 | 11.72 | 15.22 |
| 600 | 9.07 | 13.33 | 18.00 |
| 650 | 10.13 | 15.25 | 20.52 |
| 700 | 11.22 | 17.28 | 23.65 |
| 750 | 12.33 | 19.52 | 26.83 |
| 800 | 13.53 | 21.87 | 30.25 |
| 850 | 14.73 | 24.20 | 33.95 |
| 900 | 15.93 | 26.58 | 37.62 |
| 950 | 17.20 | 29.07 | 41.47 |
| 1000 | 18.45 | 31.83 | 45.87 |

[a]flow reversed 4 times per minute
[b]flow reversed 1 time per minute
[c]flow reversed 0.5 times per minute Data in Table 3 show that faster rates of flow reversal provide shorter times to process a water sample containing suspended solids.

Example 5

In this Example, a one liter sample of the Minnesota River water of Example 2 was spiked with a mixture of dimethyl, diethyl, dibutyl, and dioctylphthalate, each added at 0.1 milligrams per liter. These phthalates represent typical pollutants found in water and differ in their water solubilities. Dimethyl phthalate has the lowest capacity factor, k', and is the most soluble. Dioctyl phthalate is the least soluble, that is, more hydrophobic, and has the highest capacity factor k'. The Empore TM SPE disk of Example 1 was used in this Example. The Empore TM disk is hydrophobic and strongly sorbs the more hydrophobic or less soluble analytes such as dioctyl phthalate. Dimethyl phthalate is less hydrophobic or more soluble and is less strongly adsorbed by the Empore TM disk. The spiked river water sample was processed through the device in the bidirectional mode as described in Example 1. Recovery levels of phthalate esters are shown in Table 4.

TABLE 4

| Analyte | Percent Recovery |
|---|---|
| Dimethyl phthalate | 63 |
| Diethyl phthalate | 70 |
| Dibutyl phthalate | 68 |

TABLE 4-continued

| Analyte | Percent Recovery |
|---|---|
| Dioctyl phthalate | 87 |

Data in Table 4 demonstrates that good recoveries of plasticizers are obtained using the SPE method and apparatus of the invention. As the data indicates, better recoveries are obtained for the analytes with the higher capacity factors, k' To improve recoveries for the analytes with lower capacity factor, k', time for flow in the reverse direction should be minimized. A flow reversal rate, as shown in FIG. 3c, would provide better recoveries for an analyte like dimethyl phthalate because there would be less opportunity for the analyte to be removed from the SPE media during the SPE process.

Various modifications and alterations of this invention will become apparent to those skilled in the art without departing from the scope and spirit of this invention. It therefore should be understood that this invention is not to be unduly limited to the illustrated embodiments set forth above but is to be controlled by the limitations set forth in the claims and any equivalents thereof.

What is claimed is:

1. A method of performing a solid phase extraction, which comprises:
   (a) providing a volume of the fluid that contains solubles and suspended solids;
   (b) processing the volume of fluid to extract solubles therefrom by the steps comprising:
      (i) passing a first portion of the volume of fluid through a solid phase extraction medium that has first and second sides, the first portion of the volume of fluid passing through the solid phase extraction medium from the first side to the second side; and then
      (ii) passing a second portion of the volume of fluid through the solid phase extraction medium from the second side to the first side; and
   (c) repeating step (b) a plurality of times such that no substantial amount of the suspended solids is removed from the processed volume of fluid and solubles are retained on the solid phase extraction medium.

2. The method of claim 1, wherein fluid flow through the solid phase direction of extraction medium is reversed to accomplish step (b).

3. The method of claim 2, wherein the volume of fluid contains 0.1 milligram to 20 grams of suspended solids per liter, and step (b) is repeated 0.2 to 12 times per minute.

4. The method of claim 3, wherein the volume of fluid contains 10 to 20 grams of suspended solids per liter and step (b) is repeated at least 4 times per minute.

5. The method of claim 3, wherein the volume of fluid contains 0.1 milligram to 10 grams of suspended solids per liter, and step (b) is repeated less than 0.3 times per minute.

6. The method of claim 1, wherein the solid phase extraction medium is rotated approximately 180 degrees to the direction of fluid flow to accomplish step (b).

7. The method of claim 3, wherein the volume of fluid contains 0.1 to 20 grams of suspended solids per liter and step (b) is repeated 0.2 to 12 times per minute.

8. The method of claim 1, wherein steps (i) and (ii) of step (b) occur at essentially equal time intervals.

9. The method of claim 1, wherein step (ii) of step (b) has a substantially shorter time interval than step (i) of step (b).

10. The method of claim 1, wherein a sensor is employed to detect a substantial decrease in flow when the first portion of the volume of fluid is passed through the solid phase extraction media in step (b) (i), and wherein step (b) (ii) is initiated when the sensor detects the substantial decrease in flow.

11. The method of claim 1, wherein the solid phase extraction medium is selected from the group consisting of: a polytetrafluoroethylene fibril matrix having non-swellable sorptive particles enmeshed in the matrix; a polyvinyl chloride sheet containing sorptive particles; a porous organic polymeric resin; a porous functionalized polymeric membrane; glass fibrous membrane containing sorptive material; and combinations thereof.

12. The method of claim 11, wherein the solid phase extraction medium includes a polytetrafluoroethylene fiber matrix having non-swellable sorptive particles enmeshed in the matrix.

13. The method of claim 1, wherein the volume of fluid is aqueous and less than fifteen weight percent of the suspended solids are removed from the processed aqueous volume of fluid.

14. The method of claim 13, wherein the solubles in the fluid are selected from the group consisting of plasticizers, pesticides, dioxins, polynuclear aromatics, polychlorinated biphenyls, drug residues, and combinations thereof.

15. A method of performing solid phase extraction on a volume of aqueous fluid that contains suspended solids and solubles, which method comprises:
   (1) performing steps a–f in sequential order:
      (a) causing a first portion of the volume of aqueous fluid to enter a conduit that contains a solid phase extraction medium;
      (b) passing the first portion of the volume of aqueous fluid through the solid phase extraction medium to extract solubles therefrom, the solid phase extraction medium having first and second sides and the first portion of the volume of fluid being passed through the solid phase extraction medium from the first side to the second side;
      (c) causing the first portion of the volume of aqueous fluid to exit the conduit;
      (d) causing a second portion of the volume of aqueous fluid to enter the conduit;
      (e) passing the second portion of the volume of aqueous fluid through the solid phase extraction medium from the second side to the first side to extract solubles therefrom; and
      (f) causing the second portion of the volume of aqueous fluid to exit the conduit; and
   (2) repeating steps a–f a plurality of times in sequence until the volume of aqueous fluid has exited the conduit;
wherein the volume of aqueous fluid that exited the conduit has substantially the same concentration of suspended solids as the volume of aqueous fluid that entered the conduit, and wherein the solid phase extraction medium has retained solubles thereon.

16. The method of claim 15, wherein the solid phase extraction medium includes a polytetrafluoroethylene fibril matrix that has sorptive particles enmeshed therein.

17. The method of claim 15, wherein steps (b) and (e) are accomplished by reversing the flow of the volume of aqueous fluid, and wherein the volume of fluid that exited the conduit contains eighty-five weight percent or more of the suspended solids present in the volume of aqueous fluid that entered the conduit.

18. A method for separating solubles from a moving stream of water containing solubles and suspended material comprising the steps:
   (a) allowing the moving stream of water to impinge on a first side of a sorbent particle loaded, porous, nonwoven membrane for a time sufficient for said suspended material to at least partially clog the pores of the nonwoven membrane; and after step (a)
   (b) allowing the moving stream of water to impinge upon a second side of the particle loaded nonwoven membrane for a time sufficient for the suspended material to at least partially clog the pores of the nonwoven membrane;
   (c) repeating steps (a) and (b) until the solubles have been sorbed on the particles in the nonwoven membrane;
   wherein the resulting exiting stream after removal of the solubles contains substantially the same amount of suspended material as was present in the original moving stream.

19. The method of claim 18, wherein the resulting exit stream contains 90 weight percent or more of the suspended material present in the original moving stream.

20. An apparatus for performing solid phase extraction on a fluid, which apparatus comprises:
   (a) a conduit having at least an inlet and an outlet;
   (b) a solid phase extraction medium located in the conduit downstream to the inlet and upstream to the outlet, the solid phase extraction medium having first and second sides; and
   (c) means for causing the fluid to pass through the solid phase extraction medium from the first side to the second side and from the second side to the first side.

21. The apparatus of claim 20, wherein the means for causing the fluid to pass through the solid phase extraction medium includes a fluid flow direction altering mechanism that can cause fluid to pass through the solid phase extraction medium in first and second opposite directions.

22. The apparatus of claim 20, wherein the conduit has a first portion A' or A" in communication with the inlet and being located upstream to first and second valves, respectively, a second portion B having the solid phase extraction medium located therein and including portions B' and B" located on opposing sides of the solid phase extraction medium and a third portion C' or C" in communication with the outlet and being located downstream to first and second valves, respectively.

23. The apparatus of claim 22, wherein the fluid flow travels sequentially through conduit portions A', B', B" and C" or conduit portions A", B", B' and C'.

24. The apparatus of claim 20, further comprising means for having the inlet and the outlet in communication with each other substantially all of the time when the apparatus is in operation.

25. The apparatus of claim 24, wherein the apparatus has only one inlet and only one outlet.

26. The apparatus of claim 24, wherein the apparatus has one or more inlets and one or more outlets.

27. The apparatus of claim 20, wherein the conduit includes portions A', A", B', B", C' and C", and the fluid-flow direction altering mechanism includes first and second valves, the first and second valves being located at the intersection of portions A', B', C' and A", B", and C", respectively.

28. The apparatus of claim 27, wherein portions A' and A" are in communication with an inlet, and are upstream to the first and second valves, respectively, portion B includes portions B' and B" located on opposing sides of the solid phase extraction medium, and portions C' and C" are in communication with an outlet and are located downstream to the first and second valves, respectively.

29. The apparatus of claim 28, wherein the fluid follows the path defined sequentially by portions A', B', B", and C" or A", B", B', and C'.

30. The apparatus of claim 28, wherein the first and second valves are capable of being switched simultaneously.

31. The apparatus of claim 30, wherein the valves are capable of being switched at 0.2 to 12 times per minute.

32. The apparatus of claim 20, wherein the means for causing the fluid to pass through the solid phase extraction medium includes a mechanism capable of changing the orientation of the solid phase extraction medium so that the fluid can pass through the solid-phase extraction medium from the first side to the second side or from the second side to the first side.

* * * * *

UNITED STATES PATENT AND TRADEMARK OFFICE
CERTIFICATE OF CORRECTION

PATENT NO. : 5,403,489
DATED : April 4, 1995
INVENTOR(S) : Donald F. Hagen, et. al.

It is certified that error appears in the above-indentified patent and that said Letters Patent is hereby corrected as shown below:

Column 2, line 2, "carded" should be --carried--.

Signed and Sealed this

Thirtieth Day of May, 1995

*Attest:*

BRUCE LEHMAN

*Attesting Officer*  *Commissioner of Patents and Trademarks*